United States Patent
Lindner

[11] 3,847,471
[45] Nov. 12, 1974

[54] ROTATING PRISM FOR PROJECTORS

[76] Inventor: Franz Friedrich Lindner, Suite 1007-777 Cardero St., Vancouver, British Columbia, Canada

[22] Filed: Mar. 13, 1973

[21] Appl. No.: 340,886

[30] Foreign Application Priority Data
Mar. 30, 1972  Canada................................. 138569

[52] U.S. Cl. ................................................. 353/81
[51] Int. Cl. ............................................. G03b 21/28
[58] Field of Search ........................... 350/285–287, 350/204, 6; 353/81, 33, 46–50

[56] References Cited
UNITED STATES PATENTS
2,443,722  6/1948  Carlson................................ 353/81
3,669,547  6/1972  Sell........................................ 350/6

FOREIGN PATENTS OR APPLICATIONS
94,713  5/1922  Switzerland........................... 353/82
181,840  5/1964  U.S.S.R................................ 350/286
9,465  0/1905  Great Britain....................... 350/204

Primary Examiner—Harry N. Haroian
Attorney, Agent, or Firm—Carver and Company

[57] ABSTRACT

Optical apparatus for projecting multiple images from transparency onto screen, images including complete primary image which dominates several incomplete secondary images of reduced brightness displaced to one side of primary image and cropped so that secondary images appear on one side only of cropping line. Portion of prism lens interposed between projector lens and screen with prism lens optical axis spaced laterally from projector lens optical axis so that portion of light from projector lens is intercepted by prism lens producing secondary images. Rotation of prism lens causes secondary images to describe discontinuous orbit about primary image, primary image remaining relatively unconfused.

10 Claims, 9 Drawing Figures

PATENTED NOV 12 1974　　3,847,471
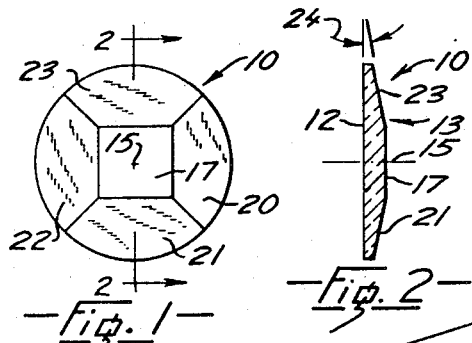
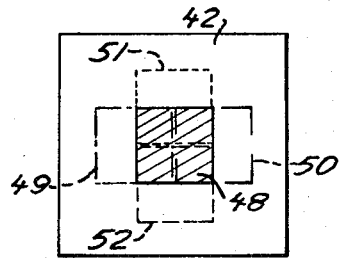
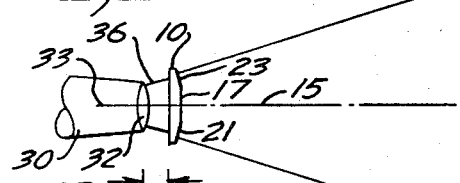
FIGS. 1 THROUGH 4 ARE PRIOR ART
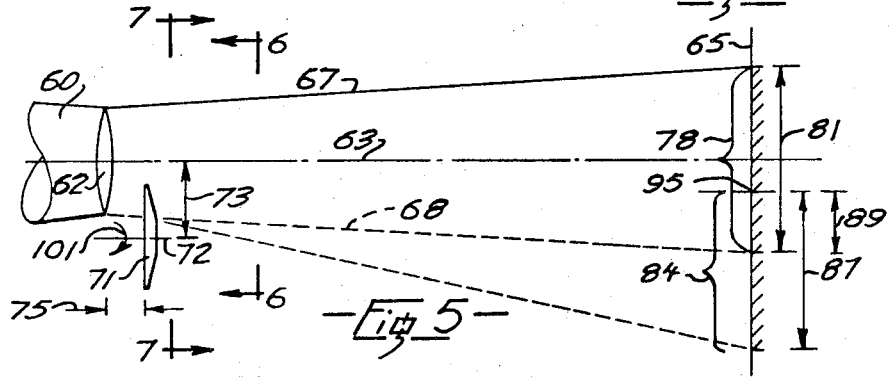
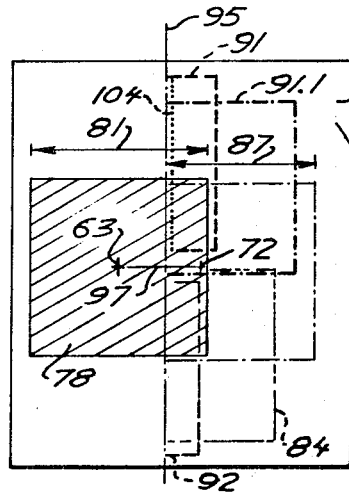
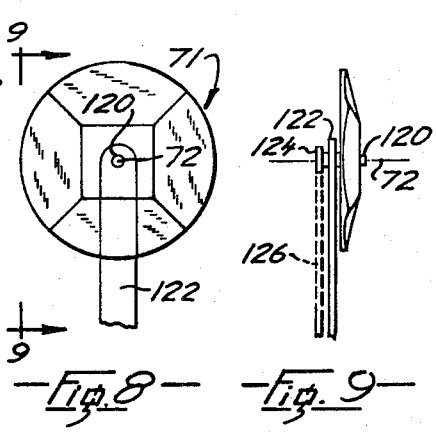

ROTATING PRISM FOR PROJECTORS

BACKGROUND OF THE INVENTION

1. Field of the Invention

The invention relates to an optical apparatus which utilises a transparency projector and has particular application in visual advertising, but is not limited thereto.

2. Prior Art

A prism lens, also known as a multiple image rotating prism, has been used with movie or still cameras for many years. The prism lens is basically a plano-convex lens having a first flat face and a multiple faceted face in which two or more flat peripheral facets extend from a periphery of the lens towards a central flat facet having a surface parallel with the first surface. The facets are disposed symmetrically about a central optical axis passing normally through the first face, the peripheral facets being spaced equally about the periphery.

To obtain novelty effects, a prism lens is commonly used in front of a camera lens, i.e., between the camera and the subject, or it can be used in front of a projector lens, i.e., between the projector lens and a screen. In both cases above, the optical axis of the prism lens is aligned with an optical axis of the projector or camera lens so that essentially all light emitted by the projector, or all light passing through the camera lens, passes also through the prism lens. An arrangement as above produces a central image of the subject surrounded peripherally by additional images of essentially equal brightness. Centres of the additional images are radially spaced equally from a centre of the central image, radial spacing being dependent on angle of the facet to the first surface of the lens and other variables, and the number of additional images is equal to the number of peripheral facets of the lens.

In most instances radial spacing of images as above is such that a major portion of each additional image overlaps the central image and adjacent additional images, such that there is confusion in the resulting effect. As the prism lens used in the manner above is designed primarily as a novelty item such confusion is deliberate and confusion is increased by rotating the prism lens about the optical axis thereof. This rotation causes the additional images to describe an orbit centred on the central image, which orbiting increases image confusion, producing a deliberately blurred, kaleidoscope effect.

SUMMARY OF THE INVENTION

An optical apparatus according to the present invention produces an optical effect different from effects produced by prior art apparatus known to the inventor.

The present invention uses a prism lens having an optical axis, the prism lens being spaced in front of a projector having a projector lens with an optical axis. In the present invention the axes of the lenses are spaced laterally so that a portion of the prism lens overlaps a portion of the projector lens, thus the prism lens intercepts only a portion of light transmitted by the projector lens.

The present invention projects multiple images onto a screen, the images being characterized by a complete primary image and several incomplete secondary images displaced from the primary image, the primary image appearing to be brighter than the secondary images so as to dominate the secondary images. A portion of each incomplete secondary image overlaps a portion of the primary image, but such overlap does not confuse the primary image due to the difference in brightness of the images.

The secondary images are incomplete at one side due to cropping which occurs at a cropping line perpendicular to a line joining the axes of the projector lens and prism lenses produced to intersect the screen. The secondary images occupy a portion of the screen on one side only of the cropping line. Means to rotate the prism lens about the optical axis thereof are provided and rotation of the prism lens causes the secondary images to orbit about the centre of the primary image, the orbit of the secondary images being limited to a discontinuous orbit by the cropping line. The multiple images of the invention are therefore reduced to a relatively unconfused primary image adjacent a discontinuous orbit of less bright incomplete secondary images, which appear and disappear on one side of the cropping line.

A detailed description following, related to drawings, gives exemplification of apparatus according to the invention which, however, is capable of expression in structure other than that particularly described and illustrated.

DESCRIPTION OF THE DRAWINGS

FIG. 1 is a plan view of a multiple image prism lens having five facets,

FIG. 2 is a section on 2—2 of FIG. 1,

FIG. 3 is a fragmented diagram of a projector using the prism lens in an arrangement according to the prior art, FIG. 4 is a diagram of an image thrown by the projector of FIG. 3, FIG. 5 is a diagram of a projector in combination with the prism lens, the combination being according to the invention, FIG. 6 is a diagram of the lens and prism combination as seen from 6—6 of FIG. 5, FIG. 7 is a fragmented diagram of images thrown onto a screen by the projector combination of FIG. 6, FIG. 8 is a fragmented front elevation of means to rotate the prism lens, FIG. 9 is a simplified side elevation on 9—9 of FIG. 8.

DETAILED DISCLOSURE

FIGS. 1 through 4 are prior art.

FIGS. 1 and 2

A mutiple-image rotating prism, hereinafter prism lens 10, has a first flat face 12 and a convex faceted face 13. The lens has a central optical axis 15 normal to the first face 12. The face 13 has a central facet 17, which facet is square in outline and is disposed parallel to the surface 12, and is surrounded by four peripheral facets 20, 21, 22, 23 inclined equally to the face 12 at a prism angle 24. The angle 24 is about 15°, however, any angle within a range of about 13° to 18° would be suitable.

FIGS. 3 and 4

A projector (not shown) has a lens mounting tube 30 holding a projector lens 32 having an optical axis 33. The prism lens 10 is mounted so that the optical axis 15 is aligned with the optical axis 33 of the projector lens 32. The lens 10 is spaced normally from the projector lens 32 by a spacing 35 of the order of ½ inch to 1 inch. For conveniennce, a transparency having a square format is selected as an example for projecting. Light rays 36 emitted by the lend 32 are intercepted by the prism lens and are focused onto a screen having a reflecting surface 42. Each peripheral facet produces a corresponding additional image, light rays transmitted by the facets 23 and 21 producing additional images 49 and 50. The central facet 17 produces a central image 48, and images 51 and 52 (FIG. 4 only) are produced by light rays transmitted by facets 20 and 22, not shown in FIG. 3. Thus the screen 42 has a display of a central primary image 48 surrounded by four peripherally spaced secondary images 49 through 52, the images, widths of which are designated by brackets in FIG. 3, overlapping as shown in FIG. 4.

As seen in FIG. 4, the images from each facet overlap to a considerable degree so that the central image 48 has portions of the four secondary images superimposed on it. All images are complete as shown, i.e., there is no cropping of the images, however in some arrangements some degree of cropping of the images can occur. The degree of cropping and overlapping is proportional, in the main, to the spacing 35, focal length of the projector lens and the prism angle 24. Brightness of the images is roughly equal, and the display on the screen is generally confused. Rotation of the lens 10 about the axis 15 results in rotation of the secondary images about the central primary image producing a deliberately confused but spectacular result.

FIGS. 5 and 6

With reference to FIG. 5, in an optical apparatus according to the invention, a projector lens mounting tube 60 has a projector lens 62 having an axis 63 and a diameter 64 (FIG. 6 only), the projector lens throwing an image onto a screen having a surface 65. With an unobstructed projector lens, light rays from the lens 62 would have boundaries designated by lines 67 and 68, the line 68 being shown in broken outline, and would produce a primary image 78 on the screen. A prism lens 71, similar to the lens 10 of FIGS. 1 and 2, is now introduced into a portion of the rays. The lens 71 has an optical axis 72 spaced transversely from the optical axis 63 of the lens 62 by a spacing 73, so that a portion of the prism lens 71 intercepts a portion of the rays from the lens 62. The prism lens 71 is interposed between the projector lens and the screen and is spaced longitudinally from the projector lens 62 by a spacing 75, which spacing is equivalent to, and of the same order of magnitude as, the spacing 35 of FIG. 3. Thus the spacing 75 is between about one quarter to three quarters of the focal length of the projector lens. The axes 63 and 72 are parallel, but a small angle between the axes is permissible, as will be explained.

As seen in FIG. 6, the spacing 73 is such that a portion of the prism lens overlaps a portion of the projector lens by a maximum radial dimension 79, which dimension is between about one quarter to one half of the diameter 64 of the projector lens. For a prism lens having a diameter approximately equal to the diameter of the projector lens, this results in an overlap area 76 (crosshatched) being between about 20 to 30 percent of the area of the projector lens. Thus, approximately 20 to 30 percent of the light from the projector lens is intercepted by the prism lens and is dispersed through an angle dependent on the prism angle and focal length of the lens 62 to produce the secondary images.

With reference to FIG. 5, when the spacing 73 is such that the prism lens does not intercept rays from the projector lens, i.e., the projector lens is unobstructed, the primary image 78 produced has a lateral dimension 81. The spacing 73 is reduced until sufficient light is intercepted to produce secondary images, one secondary image 84, being shown. The secondary image 84, is incomplete and has an overall lateral dimension 87, which overlaps the primary image by an overlap 89. The overlap 89 is dependent on factors including the focal length of the lens 62 the transverse and longitudinal spacings 73 and 75, and the prism angle. For a 4 inch projector lens of about two inch diameter the spacing 73 and 75 are about 1 changed when the overlap is changed by varying the spacing 73 between axes 63 and 72 of the lenses, which variation can be between limits of 1½ inches and 1¾ inches. The arm 122 can be mounted in a slotted support (not shown) to permit easy changing of the spacing 73, or the arm can be mounted for limiting swinging.

OPERATION

When the projector projects the images onto the screen and the prism lens 71 is rotated above the axis 72 in a direction shown by an arrow 101 (FIG. 6), the primary image 78 remains stationary and the secondary images describe a portion of an orbit shown as an arrow 103 about the primary image (FIG. 7). At a particular instant the secondary images 84 and 91 have moved to new positions 84.1 and 91.1, the secondary image 92 having moved leftwards passed the cropping line to disappear from the screen. A further secondary image 104 is just appearing to the right and at an upper end of the cropping line 95. Thus the orbit of the secondary images exists on one side only of the cropping line, and is discontinuous for the portion on the opposite side of the line, the orbit hereinafter being referred to as a discontinuous orbit.

Thus rotation of the prism lens causes a series of relatively low-illuminated secondary images to describe a discontinuous orbit at one side of a relatively bright primary image, the primary image remaining relatively unconfused notwithstanding the secondary images. This has particular advantages in advertising because the primary image is dominant and clar, but there is a suggestion of movement created by the orbiting secondary images, such movement attracting attention. Speed of rotation of the secondary images is best at about 15 rpm but can be between 10 and 20 rpm. This speed corresponds of course to speed of rotation of the prism lens.

ALTERNATIVES AND EQUIVALENTS

As described, the prism lens 71 has four peripheral facets surrounding a central facet, and has an axis 72 parallel to and displaced horizontally from the axis 63. A prism lens having more facets would produce more secondary images and this is acceptable to a limit above which the secondary images confuse the primary image. If the axis 72 were to be displaced vertically from the axis 63, the cropping axis would be horizontal and the discontinuous orbit would be visible either above or below the primary image. If the axis 72 was at an angle (not shown) to the axis 63, either in plan view or side elevation, the orbit would be shifted correspondingly and, if the angle were sufficiently large the shifted orbit would be unacceptable.

The focal length of the projector lens effects radial separation of the secondary images and is between 3 inches and 6 inches, actual length being dependent on size of screen and spacing between screen and projector.

As described the projector is adapted for front projection, i.e., it projects images onto a reflecting surface for viewing from the same side of the screen as the projector. In advertising applications it might be preferable to set the projector for rear projection, i.e., projecting images onto a translucent screen for viewing on a side of the screen remote from the projector.

In advertising applications in countries in which European-based languages are spoken, it has been found that orbit of the images from top to bottom of the screen, and left to right at the upper portion, i.e., clockwise when viewing, is best. This is as shown in FIG. 7, and is compatible with European writing which is read from left to right and top to bottom.

In other countries where reading directions are reversed, opposite rotation and position of the orbit might be preferable.

I claim:

1. An optical apparatus for projecting from a stationary transparency multiple images onto a screen, the images being characterized by a stationary and complete primary image and a plurality of moving and incomplete secondary images displaced from the primary image and occupying a portion of the screen on one side of a cropping line extending across the screen, the secondary images describing a discontinuous orbit about the primary image, the primary image being brighter than the second images, the apparatus including:
   a. a projector being adapted to project an image from the transparency onto the screen, the projector having a projector lens, the projector lens having a focal length and an optical axis,
   b. a prism lens having: a first flat face, a convex faceted face, and a central optical axis normal to the first face, the faceted face having a plurality of peripheral facets inclined equally to the first flat face; the prism lens being disposed so that the central optical axis thereof is spaced laterally from the optical axis of the projector lens so that a portion of the prism lens having the peripheral facets overlaps a portion of the projector lens so that a portion of light from the projector lens is intercepted by the prism lens to disperse rays to produce the secondary images, the cropping line defining inner edges of the secondary images and being normal to a line on the screen joining axes of the projector and prism lenses produced to meet the screen; the prism lens being interposed between the screen and projector lens and spaced at a distance from the projector lens less than the focal length of the projector lens; the prism lens being mounted for rotation about the central optical axis thereofk
   c. rotating means cooperating with the prism lens adapted to rotate the prism lens about the central optical axis thereof, so as to cause the secondary images to describe the discontinuous orbit about the primary image.

2. An optical apparatus as claimed in claim 1 in which the central optical axis of the prism lens is parallel to the optical axis of the projector lens.

3. An optical apparatus as claimed in claim 2 in which the rotating means includes:
   i. a spindle concentric with the optical axis of the prism lens, the spindle extending from one face of the prism lens,
   ii. a pulley secured to the spindle,
   iii. an arm fixed relative to the projector, the arm journalling the spindle for rotation about the optical axis of the prism lens,
   iv. a second pulley, aligned with the first pulley and powered for rotation,
   v. an endless belt passing over the first and second pulleys and adapted to rotate the prism lens.

4. An optical apparatus as claimed in claim 1 in which the spacing between the optical axes of the prism lens and the projector lens is between one-quarter and one-half of the diameter of the projector lens so that between about 20 to 30 percent of light from the projector lens is intercepted by the prism lens.

5. An optical apparatus as claimed in claim 1 in which:
   i. the projector lens has a focal length of between 3 and 6 inches,
   ii. the prism lens has a diameter of between 1 and 3 inches,
   iii. the spacing between the axes of the lenses is between about 1¼ and 1¾ inches.

6. An optical apparatus as claimed in claim 1 in which the prism lens has a total number of peripheral facets of between two and eight.

7. An optical apparatus as claimed in claim 1 in which the peripheral facets are inclined to the first flat face at an angle of between 13° and 18°.

8. An optical apparatus as claimed in claim 7 in which the angle of the peripheral facets is 15°.

9. An optical apparatus as claimed in claim 1 in which the prism lens has four peripheral facets.

10. An optical apparatus as claimed in claim 1, in which the prism lens is spaced longitudinally of the projection lens by spacing of between one-quarter and three-quarters of the focal length of the projector lens.

* * * * *